(12) United States Patent
Kyung et al.

(10) Patent No.: US 10,495,843 B2
(45) Date of Patent: Dec. 3, 2019

(54) IMAGING APPARATUS WITH ADJUSTABLE LENS AND METHOD FOR OPERATING THE SAME

(71) Applicant: ELECTRONICS AND TELECOMMUNICATIONS RESEARCH INSTITUTE, Daejeon (KR)

(72) Inventors: Ki-Uk Kyung, Daejeon (KR); Sae Kwang Nam, Daejeon (KR); Bong Je Park, Daejeon (KR); Sun Tak Park, Incheon (KR); Sung Ryul Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 11 days.

(21) Appl. No.: 15/186,867

(22) Filed: Jun. 20, 2016

(65) Prior Publication Data

US 2017/0059812 A1 Mar. 2, 2017

(30) Foreign Application Priority Data

Aug. 25, 2015 (KR) .......................... 10-2015-0119434
Mar. 18, 2016 (KR) .......................... 10-2016-0032938

(51) Int. Cl.
*G02B 7/10* (2006.01)
*H04N 5/232* (2006.01)
*G02B 15/20* (2006.01)
*G02F 1/00* (2006.01)
(Continued)

(52) U.S. Cl.
CPC ............. *G02B 7/102* (2013.01); *G02B 15/20* (2013.01); *G02F 1/00* (2013.01); *H04N 5/2356* (2013.01); *H04N 5/23212* (2013.01); *H04N 5/23296* (2013.01); *G02B 3/14* (2013.01)

(58) Field of Classification Search
CPC ............... H04N 5/2254; H04N 5/2256; H04N 5/23212; G02B 7/102; G02B 15/20; G02F 1/00
See application file for complete search history.

(56) References Cited

U.S. PATENT DOCUMENTS

| 8,531,580 | B2 | 9/2013 | Choi et al. | |
| 8,629,932 | B2 * | 1/2014 | Galstian | H04N 5/2254 348/349 |
| 8,646,690 | B2 | 2/2014 | Nunnink et al. | |

(Continued)

FOREIGN PATENT DOCUMENTS

KR   10-2012-0003751 A   1/2012

*Primary Examiner* — Antoinette T Spinks
(74) *Attorney, Agent, or Firm* — Rabin & Berdo, P.C.

(57) ABSTRACT

The present disclosure relates to an imaging apparatus and a method for operating the same, and more particularly, to a high-speed lens moving technique capable of effective multi-view angle and multi-focus images for a short period of time and an image photographing and sorting technique according the high-speed lens moving technique. Accordingly, the movement of lenses is performed using a new technique without applying the existing slow lens moving technique performed using a motor, etc., so that it is possible to acquire multi-view angle and multi-focus images using one imaging apparatus for a short period of time.

15 Claims, 13 Drawing Sheets

(51) Int. Cl.
*H04N 5/235* (2006.01)
*G02B 3/14* (2006.01)

(56) References Cited

U.S. PATENT DOCUMENTS

| | | | |
|---|---|---|---|
| 2002/0118464 A1* | 8/2002 | Nishioka | G02B 3/14 359/642 |
| 2006/0209423 A1 | 9/2006 | Kim et al. | |
| 2007/0228502 A1* | 10/2007 | Minamio | H01L 27/14618 257/431 |
| 2008/0080337 A1* | 4/2008 | Kamioka | G11B 7/1376 369/44.23 |
| 2008/0165427 A1* | 7/2008 | Tseng | G02B 3/14 359/666 |
| 2010/0073623 A1* | 3/2010 | Border | G02B 7/08 349/200 |
| 2010/0155485 A1* | 6/2010 | Tan | G06K 7/10702 235/462.42 |
| 2011/0249095 A1 | 10/2011 | Kim et al. | |
| 2012/0026297 A1* | 2/2012 | Sato | G03B 35/08 348/47 |
| 2013/0120564 A1* | 5/2013 | Imamura | G02B 7/28 348/135 |
| 2014/0139937 A1* | 5/2014 | Mao | G02B 7/08 359/811 |
| 2014/0192146 A1 | 7/2014 | Park et al. | |
| 2014/0285712 A1* | 9/2014 | Kim | G02B 7/08 348/373 |
| 2014/0313588 A1* | 10/2014 | Hong | G02B 3/00 359/642 |
| 2015/0264219 A1* | 9/2015 | Ichikawa | H04N 1/2137 348/231.2 |
| 2015/0271386 A1* | 9/2015 | Schneider | H04N 5/2254 348/349 |
| 2017/0038504 A1* | 2/2017 | Tsai | G02B 3/14 |

\* cited by examiner

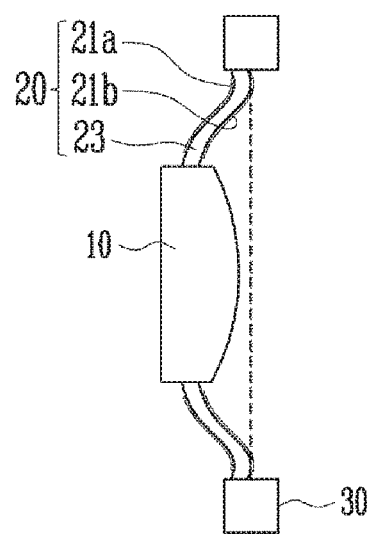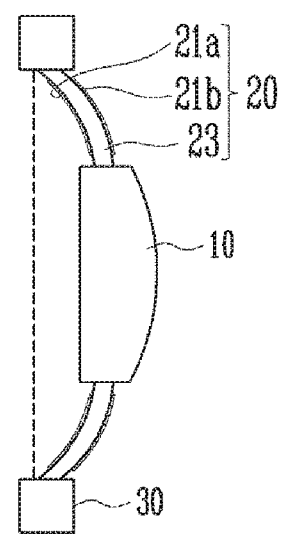

IMAGING APPARATUS WITH ADJUSTABLE LENS AND METHOD FOR OPERATING THE SAME

CROSS-REFERENCE TO RELATED APPLICATION

The present application claims priority to Korean Patent Application Numbers 10-2015-0119434 filed on Aug. 25, 2015 and 10-2016-0032938 filed on Mar. 18, 2016, in the Korean Intellectual Property Office, the entire disclosure of which is incorporated by reference herein.

BACKGROUND

1. Field

An aspect of the present disclosure relates to an imaging apparatus and a method for operating the same, and more particularly, to an imaging apparatus capable of multi-view or multi-focus images at high speed and a method for operating the same.

2. Description of the Related Art

In general, a zoom function is a function for magnifying or reducing an image. The zoom function is classified into an optical zoom function of obtaining a magnified or reduced image of a corresponding image by moving a lens included in an imaging apparatus, and a digital zoom function of obtaining a zoom effect by digitally magnifying a portion of a photographed image without moving a lens. In the optical zoom function, image quality such as sharpness or chromaticity is not degraded, and depends on the performance of an image sensor. In the digital zoom function, a limited portion of the entire image is magnified, and therefore, image quality may be degraded or distorted as compared with the original image. Meanwhile, in a case where an image is photographed by directly moving a lens, a focused image is obtained on when beams passing through the lens are formed as one point on an image sensor for recording the image. As the size of beams formed at one point increases, the focus of the beams is defocused, and therefore, focusing for adjusting the focus of beams by moving a lens plays an important role.

The optical zoom function and the focusing may be classified into a manual method in which a barrel including a lens is directly moved with a hand, and an automatic method using rotation of a motor physically connected to a lens. The automatic method includes a method using a voice coil motor (VCM) or a piezoelectric ceramic actuator as well as a motor. In the method using the motor, it is difficult to achieve miniaturization due to the volume of the motor, and noise is generated by friction between a motor rotor and a gear part for connecting a lens. In addition, it is difficult to move the lens at high speed. The method using the VCM is a method for driving the VCM using a current flowing through a coil and an electromagnetic force generated by a magnet. In the method using the VCM, there is a limitation in generation of electromagnetic waves and accuracy. The method using the piezoelectric ceramic actuator is a method for driving the piezoelectric ceramic actuator using friction between a stator and a rotor. In the method using the piezoelectric ceramic actuator, its lifespan is shortened, and its price is also high.

In order to obtain multi-view and multi-focus images using an imaging apparatus for a short period of time, it is required to quickly move lenses installed in the imaging apparatus. However, image apparatuses using the existing lens moving methods have a slow moving speed of a lens and a slow response speed with respect to a lens movement command. Therefore, it is difficult to accomplish objects.

SUMMARY

Embodiments provide an imaging apparatus and a method for operating the same, in which at least one lens is moved or vibrated at high speed, so that it is possible to acquire, for a short period of time, a plurality of images having difference focuses or a plurality of images having different view angles.

According to an aspect of the present disclosure, there is provided an imaging apparatus including: at least one optical device for moving a lens included therein according to an input voltage or deforming the lens itself; and an image sensor for acquiring a plurality of images having different view angles or focuses according to the movement of the lens or the deformation of the lens itself.

According to an aspect of the present disclosure, there is provided a method for operating an imaging apparatus including a lens, a connecting part connected to the lens, the connecting part controlling movement of the lens, and a fixing part for supporting the connecting part, the method including: setting an operational range of the lens moved according to a voltage applied to an electrode included in the connecting part; determining a number of frames to be photographed per one period by the imaging apparatus; and acquiring a plurality of images corresponding to the number of frames as the lens is moved, wherein the plurality of images have different view angles or focuses.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6A and FIG. 6B are views illustrating movement of a lens included in the optical device when a voltage is applied to both electrodes of the optical lens of FIG. 5.

DETAILED DESCRIPTION

Figure 1A:
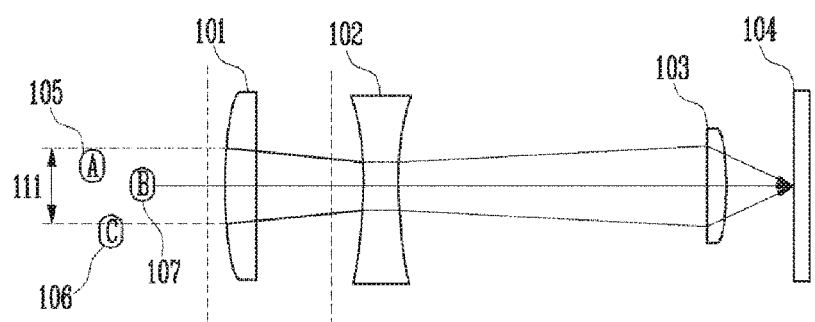
FIG. 1A, FIG. 1B and FIG. 1C are lenses arrangement states for acquiring multi-view angle images according to an embodiment of the present disclosure.

Hereinafter, exemplary embodiments of the present disclosure will be described in detail with reference to the accompanying drawings.

In describing those embodiments, description will be omitted for techniques that are well known to the art to which the present disclosure pertains, and are not directly related to the present disclosure. This intends to disclose the gist of the present disclosure more clearly by omitting unnecessary description.

Advantages and features of the present disclosure and methods of accomplishing the same may be understood more readily by reference to the following detailed description of the exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

In this specification, an imaging apparatus may be applied to various electronic devices having imaging functions. For example, the imaging apparatus may be implemented as any one of cameras equipped in digital cameras, smart phones, cellular phones, MP3 players, PMPs, tablet PCs, laptop computers, smart glasses, smart watches, and drones or flying objects.

The term "multi-view" used herein means a case where results of an image acquired from a specific subject as a target at a fixed distance through one imaging apparatus are different from each other, i.e., a case where angles that a set of lenses can cover in order to take a picture of the subject are different from each other. Also, the term "multi-view" may be used together with the term "multi-view angle."

The term "multi-focus" represents means a case where focal distances of images acquired through an imaging apparatus are different from each other, i.e., a case where distances from the imaging apparatus to points at which focused images can be obtained are different from each other.

In this specification, a picture, image, or video refers to a visual result photographed through an imaging apparatus, and one of them may be used together with the others.

The present disclosure provides an imaging apparatus and a method for operating the same, in which at least one lens is moved or vibrated at high speed in the direction of an optical axis, thereby acquiring a plurality of images having various view angles or focuses.

According to embodiments of the present disclosure, there may be provided a high-speed lens shifting technique for zooming in or zooming out a lens and an image processing system for separating and storing a plurality of mages having various view angles or focuses according to the view angles or focuses. The high-speed lens shifting technique may be achieved using a method in which a lens is quickly shifted in an optical axis by electrostatic force applied to the elastic electrodes attached or coated onto both surfaces of a flexible polymer film. That is, as the polymer film adhered at the periphery of the lens is contracted or expanded according to the kind or intensity of a signal applied to the flexible electrodes, the lens connected to the polymer film is moved forward or backward.

In the case of general cameras photographing using a typical image processing system, if a user adjusts a focus by directly turning a barrel with a hand or by using an auto focusing technique and then presses a photographing button, an image passing through a lens is stored in an image sensor as a shutter is opened and then closed for a short period of time. Alternatively, in the case of moving images, the image sensor consecutively receives images passing through the lens to consecutively store images as many as the number of images acquired per second.

According to a method for operating an imaging apparatus in the image processing system, if a photographing button is pressed, photographing is performed as a plurality of lenses for adjusting view angles are quickly moved forward/backward for a short period of time. For example, when a plurality of lenses for adjusting view angles are to be moved by 5 mm at 1 Hz and then returned, this corresponds to a distance at which the plurality of lenses is to be moved by 5 mm one way for 0.5 second. Thus, when a shutter speed of the imaging apparatus is 0.1 second, five images having different view angles or focuses can be obtained for 0.5 second. Accordingly, the photographing speed of the imaging apparatus can be determined according to the vibration period and width of the lens, and acquired images can be processed for each view angle or focus.

Hereinafter, exemplary embodiments of the present disclosure will be described in detail with reference to the accompanying drawings.

Figure 1B:
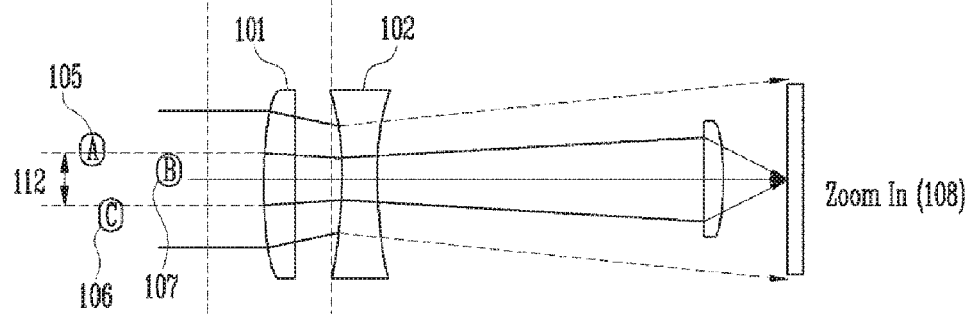
Figure 1C:
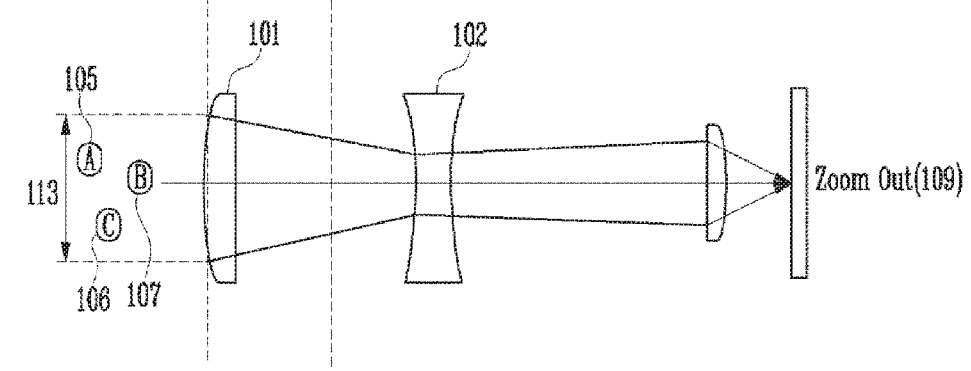

FIG. 1A, FIG. 1B and FIG. 1C are lenses arrangement states for acquiring multi-view angle images according to an embodiment of the present disclosure.

Referring to FIG. 1A, FIG. 1B and FIG. 1C, the imaging apparatus may include a view-angle adjusting lens group 101 and 102 including a plurality of lenses, at least one focus adjusting lens 103, and an image sensor 104. FIG. 1A, FIG. 1B and FIG. 1C illustrates virtual paths for comparing views according to movement of the plurality lenses included in the view-angle adjusting lens group 101 and 102, and subjects 105, 106, and 107.

The view-angle adjusting lens group 101 and 102 may include a convex lens 101 and a concave lens 102. Each of the convex and concave lenses 101 and 102 constituting the view-angle adjusting lens group 101 and 102 changes the view angle photographed by the imaging apparatus according to movement thereof. In an embodiment, the number of lenses included in the view-angle adjusting lens group 101 and 102 is not limited by FIG. 1A, FIG. 1B and FIG. 1C. In various embodiments, the view-angle adjusting lens group 101 and 102 may be configured with a plurality of lenses of which number exceeds two.

The focus adjusting lens 103 may adjust a focal position at which an image of a subject is formed according to movement thereof.

The image sensor 104 may store information on beams passing through the lenses. In an embodiment, the image sensor 104 may be a charge coupled device (CCD) image sensor or a complementary metal-oxide semiconductor (CMOS) image sensor. The kind of the image sensor 104 is not limited by FIG. 1A, FIG. 1B and FIG. 1C.

An operation of the view-angle adjusting lens group 101 and 102 including at least one lens performing a view-angle adjusting function is generally required so as to obtain images or pictures having different view angles. Specifically, movement of the convex lens 101 or the concave lens 102 except the focus adjusting lens 103 is required. The view-angle adjusting lens group 101 and 102 may include lenses corresponding to an afocal zoom system. In an embodiment, at least one lens among the focus adjusting lens 103 and the lenses included in the view-angle adjusting lens group 101 and 102 may perform both functions for focus adjustment and view-angle adjustment.

In various embodiments, the view-angle adjusting lens group may perform not only a function for inducing a change in view angle but also a function for preventing distortion of an image, aberration, etc. The view-angle adjusting lens group may further include a larger number of lenses so as to solve a problem including distortion of an image, aberration, etc.

Referring to FIG. 1A, FIG. 1B and FIG. 1C, if the focus of beams passing through the focus adjusting lens 103 is formed on the image sensor 104 in a state in which the focus adjusting lens 103 is not moved, a focused image may be acquired. In this state, if the convex and concave lenses 101 and 102 of the view-angle adjusting lens group are moved, the view angle of the image may be changed depending on a degree of movement of the convex and concave lenses 101 and 102 (111, 112, and 113). In various embodiments, the focus adjusting lens 103 may be moved together with the convex and concave lenses 101 and 102 as the view-angle adjusting lens group is moved.

Hereinafter, view angles changed depending on movement of the view-angle adjusting lens group will be described.

For example, if the lens arrangement state of the convex and concave lenses 101 and 102 is shifted from a lens arrangement state of FIG. 1A to a lens arrangement state of FIG. 1B, an image having a view angle narrower than a view angle 111 in the lens arrangement state of FIG. 1A may be acquired. Here, the term "narrow view angle" may means that the acquired image represents a magnified image (zoom in 108). When the lens arrangement state of the convex and concave lenses 101 and 102 is shifted from the lens arrangement state of FIG. 1A to the lens arrangement state of FIG. 1B, the distance between the convex and concave lenses 101 and 102 may be narrowed.

If the lens arrangement state of the convex and concave lenses 101 and 102 is shifted from the lens arrangement state to a lens arrangement state of FIG. 1C, an image having a view angle 112 wider than the view angle 111 may be acquired. Therefore, an image having a wide area covering a peripheral area including the subjects 105, 106, and 107 may be acquired (zoom out 109). When the lens arrangement state of the convex and concave lenses 101 and 102 is shifted from the lens arrangement state of FIG. 1A to the lens arrangement state of FIG. 1C, the distance between the convex and concave lenses 101 and 102 may be widened.

Figure 2:
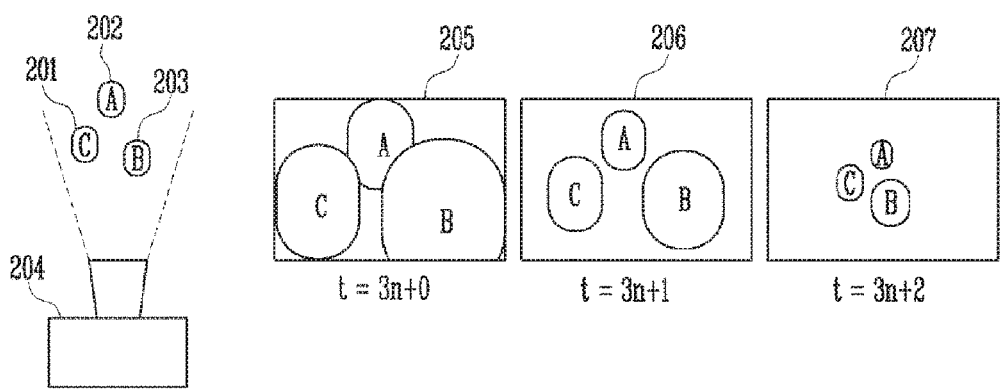
FIG. 2 is a view illustrating multi-view angle images acquired according to the operation described in FIG. 1.

FIG. 2 is a view illustrating multi-view angle images acquired according to the operation described in FIG. 1A, FIG. 1B and FIG. 1C.

FIG. 2 illustrates images of subjects 201, 201, and 203, which are acquired using an imaging apparatus 204. For example, the imaging apparatus 204 may acquire a plurality of images 205, 206, and 207 having different view angles by moving at least one lens included therein. Referring to FIG. 2, the imaging apparatus 204 may acquire three images 205, 206, and 207 having different view angles in one frame. The number of images to be acquired for every one frame by the imaging apparatus 204 is not limited by FIG. 2.

Referring to FIG. 2, the imaging apparatus 204 may use at least one lens included in a view-angle adjusting lens group and a focus adjusting lens. The imaging apparatus 204 may acquire a normal image 206, a zoom-in image 205, and a zoom-out image 207 in one frame. In an embodiment, if zoom-in is performed, a view angle is narrowed, the subjects are magnified, and the most distant subject A may be focused according to the movement of the focus adjusting lens (205). On the contrary, if zoom-out is performed, a view angle is widened, the closest subject B is focused according to the movement of the focus adjusting lens, and an image including a peripheral environment may be acquired (207). When the lens belonging to the view-angle adjusting group and the focus adjusting lens are independent from each other (e.g., when there is no lens for simultaneously adjusting a view angle and a focus), the focal position at which a focused image is formed may be changed even at the same view angle depending on movement of the focus adjusting lens. In various embodiments, the range (depth) in which a focused image is formed may be adjusted according to a design method. Therefore, all of the subjects may be focused.

Referring to FIGS. 1A, 1B, 1C and 2, the image acquired in the lens arrangement state of FIG. 1A may be the normal image 206 of FIG. 2, the image acquired in the lens arrangement state of FIG. 1B may be the zoom-in image 205, and the image acquired in the lens arrangement state of FIG. 1C may be the zoom-out image 207.

FIG. 3A, FIG. 3B and FIG. 3C are views illustrating an operation of an imaging apparatus for acquiring multi-focus images according to an embodiment of the present disclosure.

Referring to FIG. 3A, FIG. 3B and FIG. 3C, the imaging apparatus may include a view-angle adjusting lens group 301 and 302, a focus adjusting lens 303, and an image sensor 304.

In order to acquire multi-focus images, the imaging apparatus may acquire images that are respectively focused on subjects 310, 320, and 330 to be photographed by moving the focus adjusting lens 303 in the direction of an optical axis in a state in which the view-angle adjusting lens group 301 and 302 including a convex lens 301 and a concave lens 302 is fixed. For example, when the lens arrangement state of the convex and concave lenses 301 and 302 is shifted from a lens arrangement state of FIG. 3A to a lens arrangement state of FIG. 3B, the position of the focus adjusting lens 303 may come close in the direction of the image sensor 304. In this case, the focus of an image expected after photographing may be shifted from the subject B (330) located at a close distance to the subject C (320) located at a middle distance. Therefore, the image to be acquired may be changed from 340 to 350. In FIG. 3A, FIG. 3B and FIG. 3C, a solid-line image represents a focused state, and dot-line images represent a defocused state. In addition, the image represents an image of which top, bottom, left and right sides are corrected as a straight image.

When the lens arrangement state of the convex and concave lenses 301 and 302 is shifted from the lens arrangement state of FIG. 3B to a lens arrangement state of FIG. 3C, the position of the focus adjusting lens 303 may come closer in the direction of the image sensor 304. In this case, the focus of an image expected after photographing may be shifted from the subject C (320) located at a middle distance to the subject A (310) located at a distant distance. Therefore, the image to be acquired may be changed from 350 to 360. In an embodiment, the range of focal positions corresponding to lens arrangements may be changed depending on a design method including focal distances of lenses, kinds of lenses, characteristics of lenses, properties of beams, etc.

In various embodiments, the image formed on the image sensor 304 may be a reverse image obtained by reversing the top and bottom thereof according to distances between a subject and the lenses. In this case, the image sensor 304 may correct the reverse image as a straight image by reversing the top and bottom of the reverse image.

Figure 4:
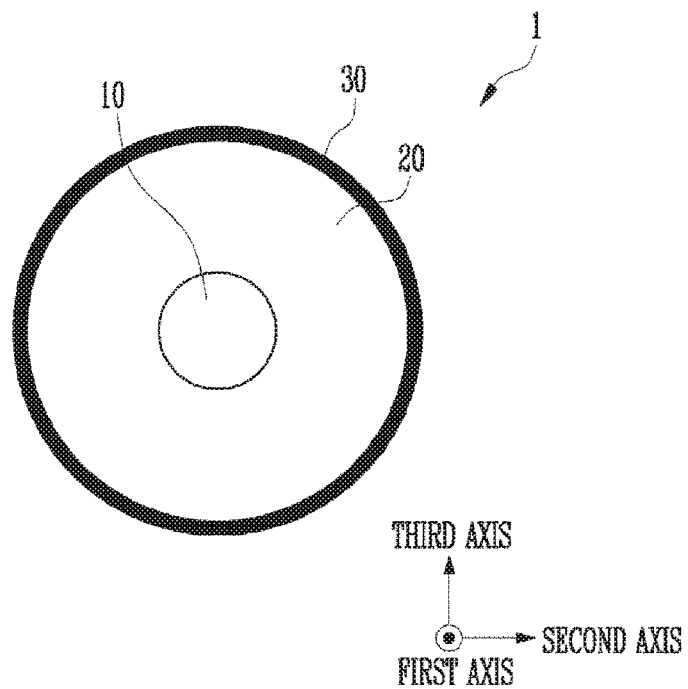
FIG. 4 is a view illustrating a schematic configuration of an optical device included in an imaging apparatus according to an embodiment of the present disclosure.

FIG. 4 is a view illustrating a schematic configuration of an optical device included in an imaging apparatus according to an embodiment of the present disclosure.

Referring to FIG. 4, the optical device 1 may include a lens 10, a connecting part 20, and a fixing part 30.

The lens 10 may transmit beams to be gathered or disperse the beams.

The connecting part 20 connects the lens 10 and the fixing part 30 to each other, and may move, at high speed, the lens 10 in the direction of a first axis. The connecting part 20 may be formed as a thin film made of a transparent material. Alternatively, the connecting part 20 may be configured with several lines having excellent elasticity. In an embodiment, the connecting part 20 may be configured with several lines in the form of thin and flat rubber bands. For example, the connecting part 20 may have the form of a polymer film made of a dielectric elastomer. In an embodiment, the connecting part 20 may be made of polydimethylsiloxane (PDMS).

The PDMS has a dielectric property. Hence, when a voltage is applied to both electrode surfaces on the PDMS, an electrostatic force is formed, and therefore, the connecting part 20 may be compressed depending on an intensity of the electrostatic force. Since the entire volume of the connecting part 20 is constant, the connecting part 20 is stretched in its length direction when it is compressed. Thus, the position of the lens 10 can be shifted.

The configuration and function of the connecting part 20 will be described in detail with reference to FIG. 5.

The fixing part 30 is connected to the connecting part 20, and may support the connecting part 20 and the lens 10. The fixing part 30 is a part that is not moved but fixed when the lens 10 is moved as the shape of the connecting part 20 is changed.

Figure 5:
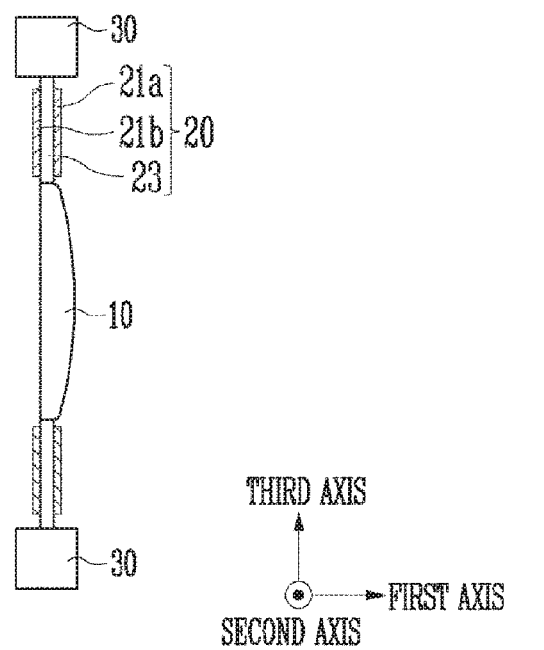
FIG. 5 is a view illustrating a section of the optical device of FIG. 4.

FIG. 5 is a view illustrating a section of the optical device of FIG. 4.

Referring to FIG. 5, the optical device may include a lens 10, a connecting part 20, and a fixing part 30. The connecting part 20 may include electrodes 21a and 21b and a deforming part 23.

The deforming part 23 connects the lens 10 and the fixing part 30 to each other. The deforming part 23 may be formed as a thin film made of a transparent material. The deforming part 23 may be configured with several lines having excellent elasticity. In an embodiment, the deforming part 23 may be configured with several lines in the form of thin and flat rubber bands.

The deforming part 23 may include a material having a dielectric property, of which shape is changed when a voltage is applied to the electrodes 21a and 21b attached to the deforming part 23. For example, the deforming part 23 may be made of electroactive polymer (EAP). The EAP has not only a fast response speed, but it also performs large operation displacement with low driving power consumption. In addition, superb workability of the EAP, which is inherent in a polymer material, makes it possible to be lighter, thinner, and smaller. The EAP is mainly divided into two kinds of EAP, i.e., an ionic EAP and an electronic EAP, according to its operation method. In the ionic EAP, polymer is contraction-expansion deformed by movement and diffusion of ions when a voltage is applied. In the electronic EAP, deformation is made by polarization when a voltage is applied.

The ionic EAP includes electrorheological fluids (ERP), carbon nanotubes (CNT), conducting polymers (CP), ionic polymer-metal composites (IPMC), ionic polymer gels (IPG), and the like. The ionic EAP has a great operating force, a fast response speed, and a low applied voltage.

The electronic EAP includes liquid crystal elastomers (LCE), electro-viscoelastic elastomers, electrostrictive polymer, electrostrictive graft elastomers, dielectric elastomers, ferroelectric polymers, and the like. The electronic EAP has a fast response speed and precise displacement adjustment.

In an embodiment, the deforming part 23 may be made of PDMS that is transparent and elastic. The PDMS has a dielectric property. Hence, when a voltage is applied to both ends of the PDMS, an electrostatic forces formed, and therefore, the deforming part 20 may be compressed depending on an intensity of the electrostatic force. Since the entire volume of the deforming part 23 is constant, the deforming part 23 is stretched in its length or surface direction when it is compressed. Thus, the position of the lens 10 can be shifted.

Specifically, in the case of a material having the dielectric property, if a voltage is applied to electrodes having excellent elasticity, which are respectively attached to a material having excellent elasticity, an electrostatic force is formed between both the electrodes, so that the deformation of the material is made depending on a balanced state of the deforming part 23 or a magnitude of the electrostatic force.

The electrodes 21a and 21b are formed at the deforming part 23. Specifically, the electrodes 21a and 21b may be respectively formed on a first surface of the deforming part 23 and a second surface opposite to the first surface.

According to the embodiment of the present disclosure, as a voltage is applied to both the electrodes 21a and 21b of the deforming part 23 in the form of a thin film made of a PDMS material, a compression force may be generated between surfaces of the electrodes 21a and 21b. The deforming part 23 in the form of a film or rubber bands is stretched in its length direction, so that the lens 10 connected to the deforming part 23 can be shifted, i.e., moved in the direction of an optical lens. If the applied electrical signal is removed, the gravity (compression force) between both the electrodes 21a and 21b is removed, and thus the deforming part 23 that was stretched in its length direction is returned to its original position while recovering its original thickness.

In this case, the electrodes 21a and 21b may include an elastic material, e.g., polymer such that the shapes of the electrodes 21a and 21b can also be deformed as the shape of the deforming part 23 is changed. In addition, a transparent electrode or a flexible electrode may be used when necessary.

Figure 3:
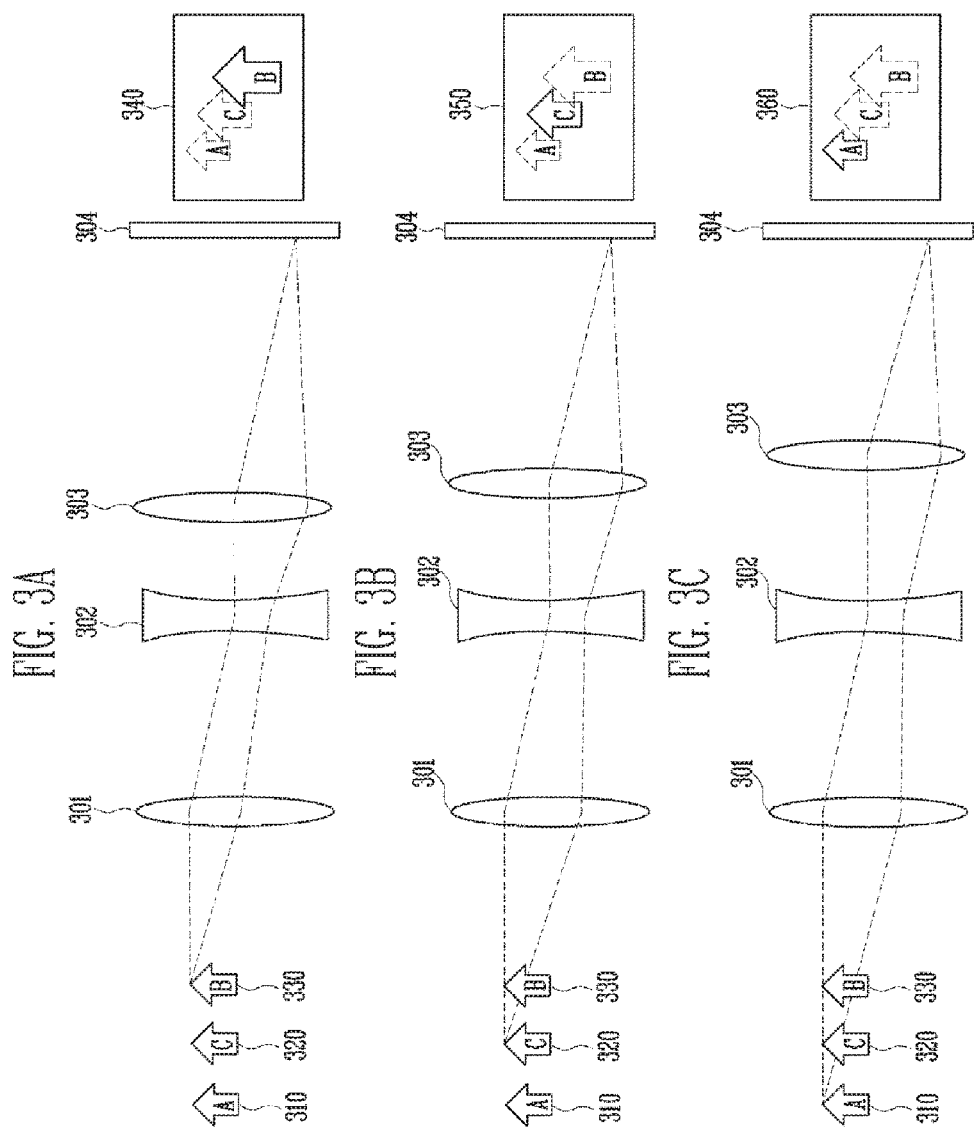
FIG. 3A, FIG. 3B and FIG. 3C are views illustrating an operation of an imaging apparatus for acquiring multi-focus images according to an embodiment of the present disclosure.

The optical device described with reference to FIG. 4 may be a lens included in a view-angle adjusting lens group or a focus adjusting lens, which has been described with reference to FIGS. 1 to 3.

FIG. 6A and FIG. 6B are views illustrating movements of the lenses included in the optical device when a voltage is applied to both the electrodes of the optical lens of FIG. 5.

Referring to FIG. 6A and FIG. 6B, if a voltage is applied to the electrodes 21a and 21b, the deforming part 23 is stretched or contracted according to the generated electrostatic force, so that the lens 10 can be moved forward/backward. For the degree of shifting of the lens 10, the lens 10 may be deformed as a form concave to the left as shown in a state of FIG. 6A or a form convex to the right as shown in a state of FIG. 6B depending on a structure of the deforming part 23, a size and kind of the electrodes, and a voltage applied to the electrodes.

If the voltage applied to the electrodes 21a and 21b is removed, the position of the lens 10 may be restored to a reference state as the deforming part 23 is returned to its original position.

Specifically, the moving direction and distance of the lens 10 may be changed depending on a thickness of the deforming part 23, a dielectric constant of the deforming part 23, an intensity of the applied electrical signal, a structure of the connecting part 20 including the lens, and a manufacturing method.

In an embodiment, when the lens 10 is a lens included in a view-angle adjusting lens group, multi-view angle images may be acquired as the lens 10 is moved.

In an embodiment, when the lens 10 is a focus adjusting lens, multi-focus images may be acquired as the lens 10 is moved.

In FIG. 5, FIG. 6A and FIG. 6B, it is illustrated that the lens 10 is a focus adjusting lens. However, this is merely an example for convenience of description, and may be applied to various types of lenses.

Figure 7:
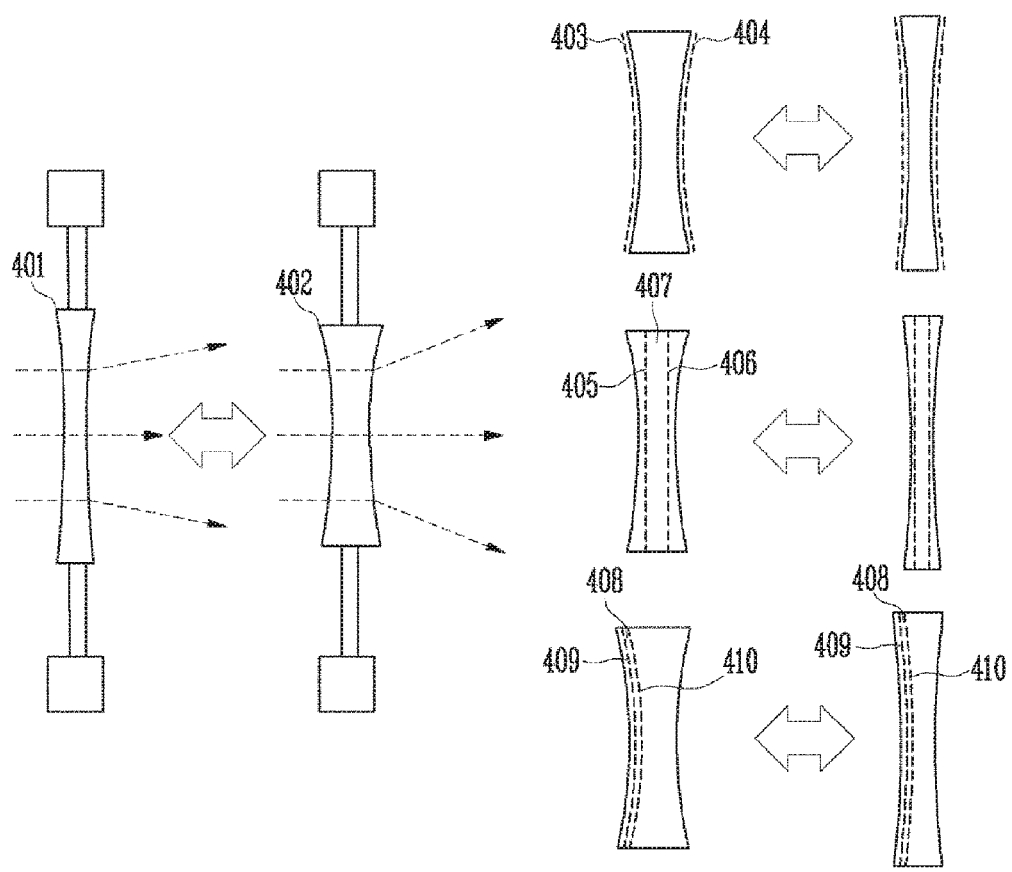
FIG. 7 is a view illustrating a lens included in an imaging apparatus and an operation thereof according to an embodiment of the present disclosure.

FIG. 7 is a view illustrating a lens included in an imaging apparatus and an operation thereof according to an embodiment of the present disclosure.

In the embodiment of FIG. 7, a method for directly inducing a change in the shape of the lens will be described. Specifically, in a state in which a lens is not moved in the direction of an optical axis, the shape of the lens is directly changed, so that it is possible to induce the same phenomenon that the lens is moved as described in the embodiment of FIG. 6A and FIG. 6B. That is, in addition to the lens shifting method among methods for changing the path of beams, a change in the shape of a lens may be directly induced, if the lens is made of a flexible material. For example, when each of lenses 401 and 402 included in a view-angle adjusting lens group is made of a transparent and flexible material, if the lens shifting method described with reference to FIG. 6 is directly applied to the lens, the lens is stretched (401) or contracted (402) depending on an input electrical signal (voltage), and therefore, the path of beams may be changed. The method for directly changing the shape of the lens may be implemented according to the following four methods.

In a first method, when transparent flexible electrodes 403 and 404 are respectively coated or attached onto both surfaces of the lens, and the material of the lens is a material reacting with an electrostatic force generated according to a voltage to the electrodes 403 and 404, the lens may be stretched or contracted depending on an input electrical signal.

In a second method, when two transparent flexible electrodes 405 and 406 and a deforming part 407 changed depending on a signal applied to the transparent flexible electrodes 405 and 406 are inserted into the middle of the lens or attached inside the lens, the shape of the entire lens may be changed depending on an electrical signal.

In a third method, when two transparent electrodes 409 and 410 required to be changed and a deforming part 408 changed depending on a signal applied to the transparent electrodes 409 and 410 are attached to an outside of the lens or tightly connected to each other, a change in the shape of the lens may be induced.

In a fourth method, a tensile or contractile force induced due to a change in the shape of a string or film connected to the periphery of the lens has influence on the lens, so that the shape of the lens is changed. This will be described in detail with reference to FIG. 13.

Figure 8:
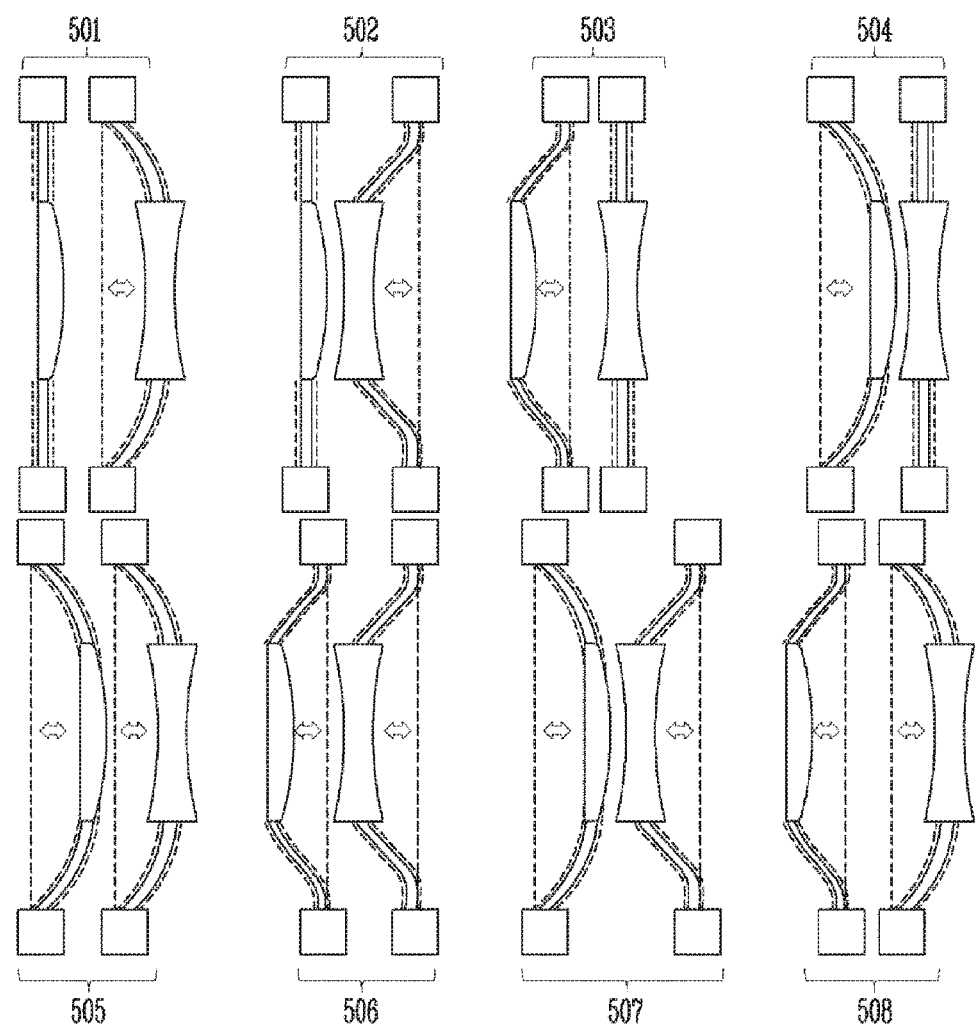
FIG. 8 is a view illustrating operations of a plurality of lenses included in a view-angle adjusting lens group and a focus adjusting lens in an imaging apparatus according to an embodiment of the present disclosure.

FIG. 8 is a view illustrating operations of a plurality of lenses included in a view-angle adjusting lens group and a focus adjusting lens in an imaging apparatus according to an embodiment of the present disclosure.

In description of FIG. 8, it is assumed that two lenses are shifted. Each of the two lenses shown in FIG. 8 may be any one of a lens included in the view-angle adjusting lens group and the focus adjusting lens. Also, each of the lenses may be independently or relatively operated.

The number of lenses included in the view-angle adjusting lens group is not limited by FIG. 8. Although FIG. 8 illustrates that the lenses are configured with only two kinds of lenses, i.e., convex and concave lenses, more kinds of lenses may be used according to characteristics of images to be acquired. The number of focus adjusting lenses is also not limited by FIG. 8.

Referring to FIG. 8, the form of the lenses through lens shifting may be divided into eight operations 501 to 508 according to operations of the lenses.

First, as only the concave lens is moved forward in a state in which the convex lens is stopped, a change in view angle or focus is possible (501). Alternatively, as only the concave lens is moved backward in the state in which the convex lens is stopped, a change in view angle or focus is possible (502). In addition, as only the convex lens is moved backward in a state in which the concave lens is stopped, a change in view angle or focus is possible (503). Alternatively, as only the convex lens is moved forward in the state in which the concave lens is stopped, a change in view angle or focus is possible (504).

Meanwhile, the present disclosure is not limited thereto, and a case where the two lenses are simultaneously moved will be described. As the two lenses are simultaneously moved forward while having a difference in movement amount between the two lenses, a change in view angle or focus is possible (505). Alternatively, as the two lenses are simultaneously moved backward while having a difference in movement amount between the two lenses, a change in view angle or focus is possible (506). In addition, as the convex lens is moved forward and the concave lens is moved backward, a change in view angle or focus is possible (507). Alternatively, as the convex lens is moved backward and the concave lens is moved backward, a change in view angle or focus is possible (508). That is, the imaging apparatus of the present disclosure can be operated in various modes by combining movements of the lenses according electrical signals applied to the above-described connecting part or each of the lenses. In general, when the number of lenses is n, various movements can be implemented as many as the number of cases of $3^n-1$ (−1 denotes a case where all of the lenses are in a stop or neutral state).

FIGS. 9 to 12 are views illustrating that multi-focus images are acquired according to operations of an optical device according to an embodiment of the present disclosure.

Figure 9:
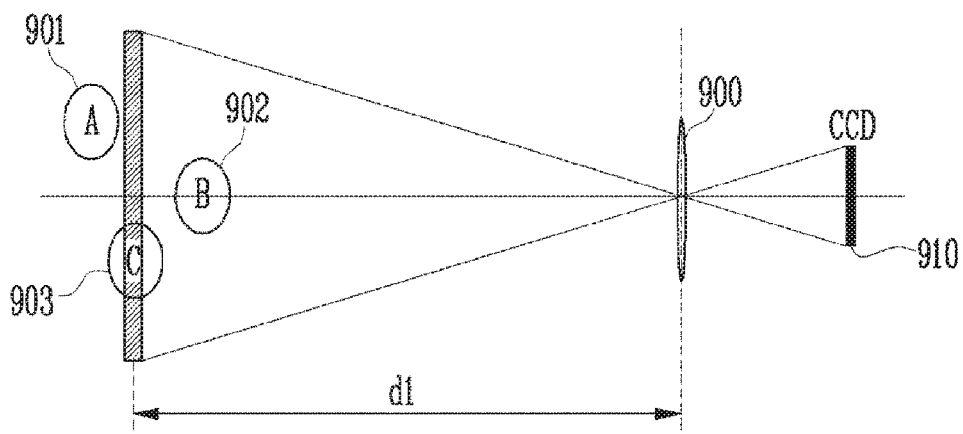
FIG. 9 is a view illustrating an image acquired in a reference state.

FIG. 9 is a view illustrating an image acquired in a reference state.

Figure 10:
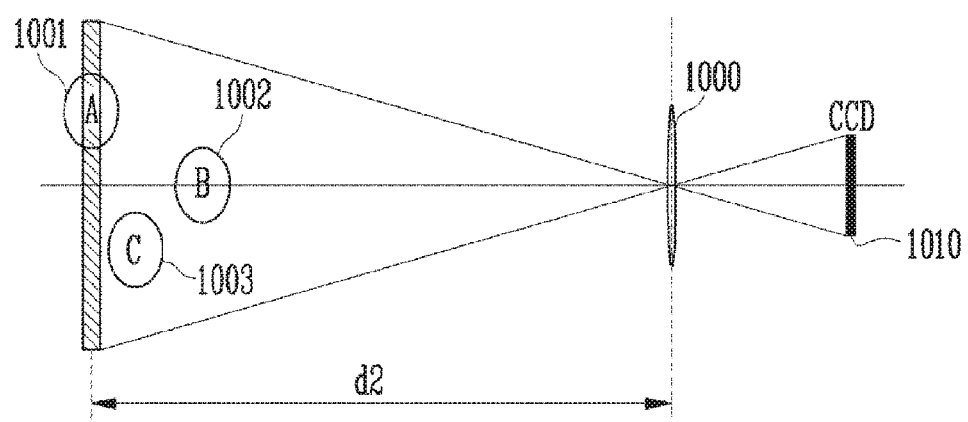
FIG. 10 is a view illustrating a case where an image focused on a long-distance subject is acquired.
Figure 11:
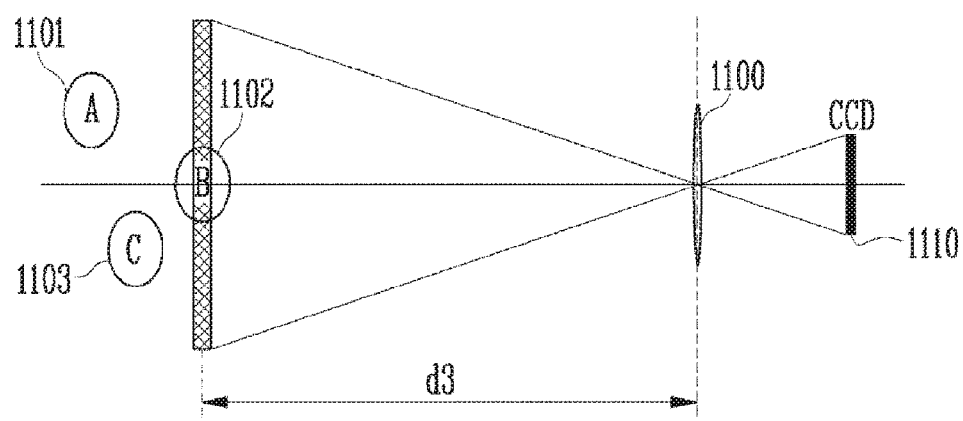
FIG. 11 is a view illustrating a case where an image focused on a short-distance subject is acquired.
Figure 12:
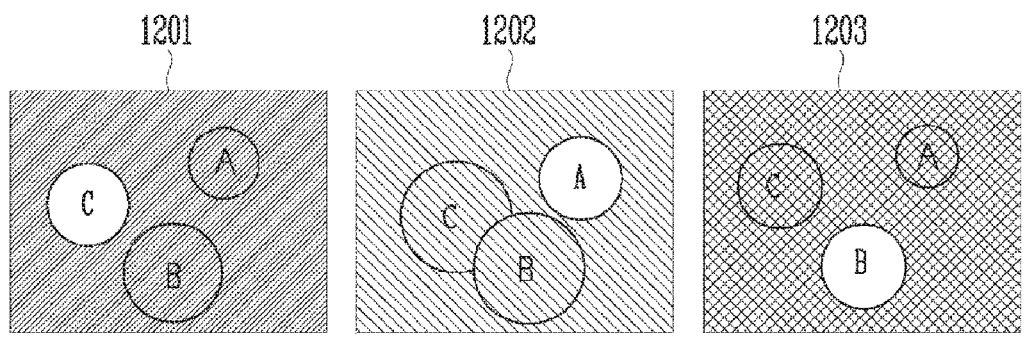
FIG. 12 is a view illustrating the images acquired according to FIGS. 9 to 11.

FIG. 12 is a view illustrating the images acquired according to FIGS. 9 to 11.

Referring to FIGS. 9 and 12, three subjects are disposed at the front of an imaging apparatus. Distances between the imaging apparatus and the respective subjects may be different from each other. For example, a subject A (901) may be located most distant from the imaging apparatus, a subject B (902) may be located closest to the imaging apparatus, and a subject C (903) may be located between the subject A (901) and the subject B (902).

A virtual integrated lens 900 including a plurality of lenses is disposed in the reference state. The subject C (903) (or a plane at its distance) may be focused according to a focal distance d1 therefrom. An image in which the subject C (903) is most clearly viewed is acquired in an image sensor 910. The other subjects A and B are not focused, and therefore, may not be clearly viewed.

The image acquired according to the focal distance d1 in FIG. 9 may be a first image 1201 of FIG. 12.

FIG. 10 is a view illustrating a case where an image focused on a long-distance subject is acquired.

Referring to FIGS. 10 and 12, three subjects are disposed at the front of an imaging apparatus. Distances between the imaging apparatus and the respective subjects may be different from each other. For example, a subject A (1001) may be located most distant from the imaging apparatus, a subject B (1002) may be located closest to the imaging apparatus, and a subject C (1003) may be located between the subject A (1001) and the subject B (1002).

A virtual integrated lens 1000 including a plurality of lenses is disposed to have a focal distance d2 from the subject A (1001). The subject A (1001) (or a plane at its distance) may be focused according to the focal distance d2 therefrom. An image in which the subject A (1001) is most clearly viewed is acquired in an image sensor 1010. The other subjects B and C are not focused, and therefore, may not be clearly viewed.

The image acquired according to the focal distance d2 in FIG. 10 may be a second image 1202 of FIG. 12.

FIG. 11 is a view illustrating a case where an image focused on a short-distance subject is acquired.

Referring to FIGS. 11 and 12, three subjects are disposed at the front of an imaging apparatus. Distances between the imaging apparatus and the respective subjects may be different from each other. For example, a subject A (1101) may be located most distant from the imaging apparatus, a subject B (1102) may be located closest to the imaging apparatus, and a subject C (1103) may be located between the subject A (1101) and the subject B (1102).

A virtual integrated lens 1100 including a plurality of lenses is disposed to have a focal distance d3 from the subject B (1102). The subject B (1102) (or a plane at its distance) may be focused according to the focal distance d3 therefrom. An image in which the subject B (1102) is most clearly viewed is acquired in an image sensor 1110. The other subjects A and C are not focused, and therefore, may not be clearly viewed.

The image acquired according to the focal distance d3 in FIG. 11 may be a third image 1203 of FIG. 12.

In a case where a lens is a focus adjusting lens when movement of the lens or deformation of the lens occurs as described with reference to FIGS. 4 to 8, the images of FIG. 12 can be acquired at a time.

Figure 13:
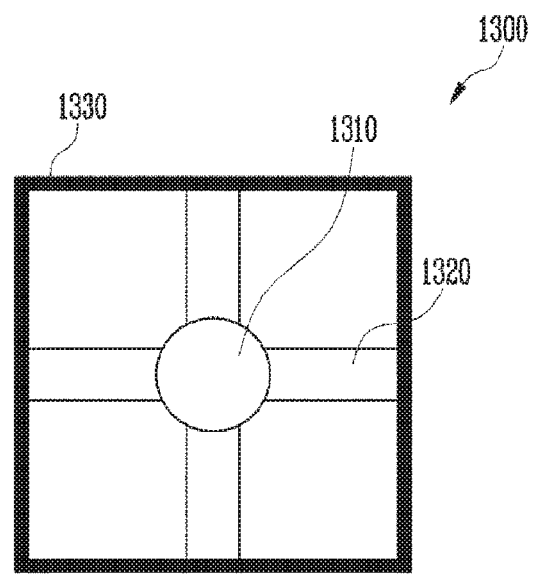
FIG. 13 is a view illustrating a structure of an optical device according to an embodiment of the present disclosure.

FIG. 13 is a view illustrating a structure of an optical device according to an embodiment of the present disclosure.

Referring to FIG. 13, the optical device 1300 may include a lens 1310, a connecting part 1320, and a fixing part 1330.

Unlike the optical device 1 of FIG. 4, in the optical device 1300 of FIG. 13, the fixing part 1330 may have a quadrangular section. In addition, unlike the connecting part 20 of FIG. 4, the connecting part 1320 does not have the form of a film but may be provided in plurality. In this case, the plurality of connecting parts 1320 may be distributed in a balanced way. For example, the connecting part 1320 may be connected to only a portion of the lens 1310 and a portion of the fixing part 1330.

The shape of the fixing part 1330 is not limited by FIG. 4 or 13, and the fixing part 1330 may be implemented in various shapes to support the lens 1310 and the connecting part 1320.

If a voltage is applied to the connecting part 1320 of the optical device 1300 of FIG. 13, it is possible to obtain a shifting effect of the lens 1310 in the direction of an optical axis. In addition, the shape of the lens 1310 can be changed by a force applied when the connecting part 1320 in the form of a film adhered at the periphery of the lens 1310 is stretched. For example, when the lens 1310 is made of a flexible material, a force concentrated in the direction of the center of the lens 1310 with respect to the fixing part 1330 is generated as the film adhered at the periphery of the lens 1310 is stretched. Therefore, the shape of the lens 1310 may be changed as the lens 1310 is compressed. Also, the shape of the surface of the lens 1310 may be changed. Whether the lens 1310 is to be shifted by deformation of the connecting part 1320, whether the shape of the lens 1310 is to be changed without shifting, or whether shifting and a change in the shape of the lens 1310 are to occur at the same time may be determined according to properties of the lens 1310, properties of the connecting part 1320, arrangement of electrodes, or external conditions including a new structure, etc.

Figure 14:
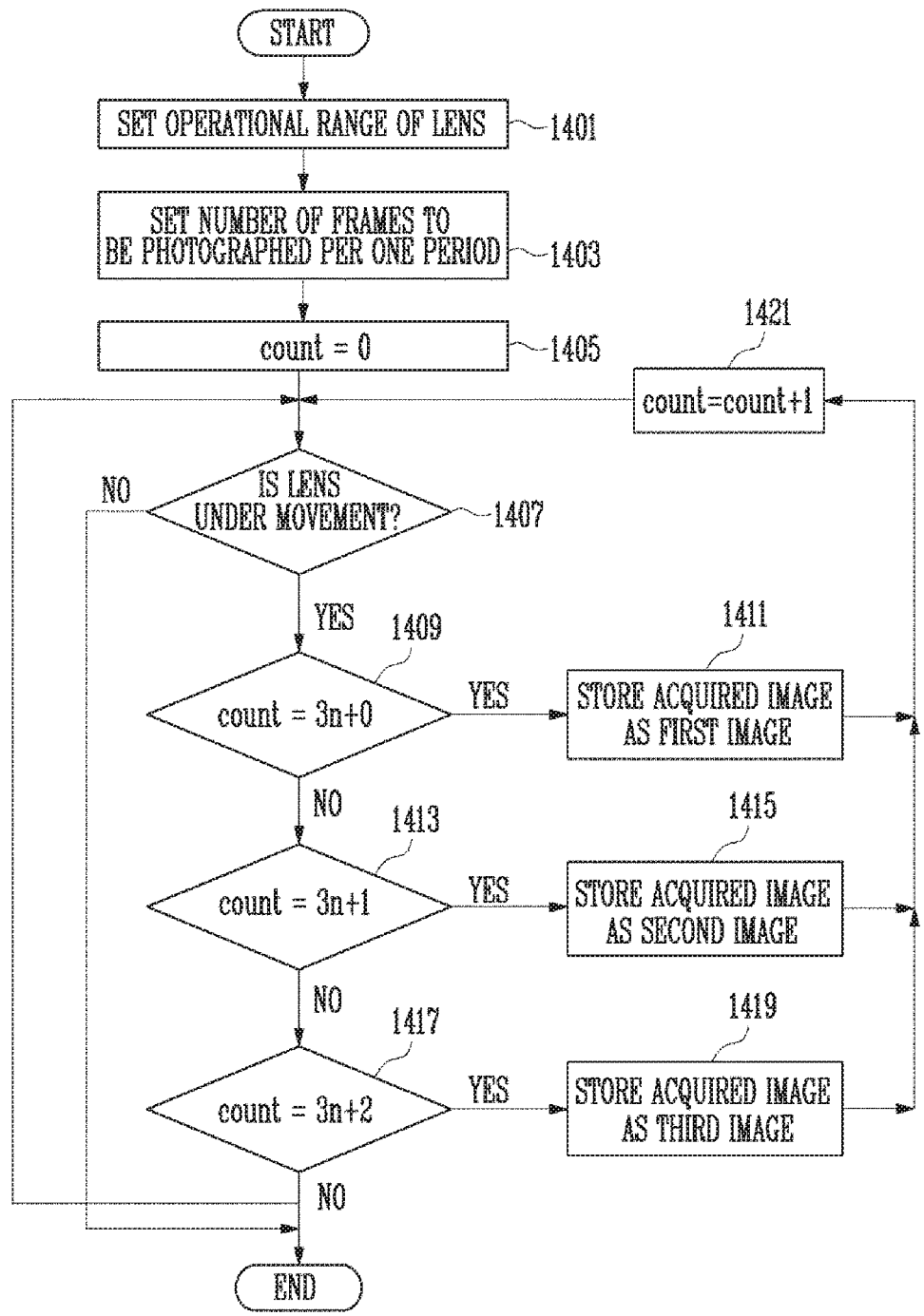
FIG. 14 is a flowchart illustrating a method for operating an imaging apparatus according to an embodiment of the present disclosure.

FIG. 14 is a flowchart illustrating a method for operating an imaging apparatus according to an embodiment of the present disclosure.

If at least one individual lens included in a view-angle adjusting lens group and a focus adjusting lens are shifted at high speed when the imaging apparatus acquires images, an image sensor may photographs and stores, in real time, images having different view angles or images having different focuses. In this process, the imaging apparatus may store the acquired images for each view angle or each focus.

Referring to FIG. 14, in step 1401, the imaging apparatus sets an operational range of a lens. The operational range of the lens may be a maximum distance at which the lens is moved forward/backward through shifting. For example, the operational range of the lens may be changed depending on the intensity of a voltage applied to an optical device.

In step 1403, the imaging apparatus may set a number of frames to be photographed per one period. Specifically, if the operational range of the lens is set in step 1401, the imaging apparatus may set a number of images to be acquired by an image sensor during one period, i.e., a number of frames. Here, the one period is a period of time until the lens is moved by the operational range in a reference state and then returned to the reference state. In FIG. 14, for convenience of illustration, a case where the number of frames is 3 will be described as an example. However, the number of frames is not limited by FIG. 14.

In step 1405, the imaging apparatus sets an internal count value to 0.

In step 1407, the imaging apparatus may determine whether the lens is under movement. If the movement of the lens is stopped, image acquisition is completed, and therefore, the operation of the imaging apparatus is ended. In step 1407, if the lens is under movement, the imaging apparatus proceeds to step 1409.

In steps 1409 to 1421, the imaging apparatus increases the internal count value whenever an image is acquired, and may sort the acquired images according to the internal count value.

In step 1409, when the internal count value is 3n+0 (n is a natural number), the imaging apparatus may determine that the image acquired by the image sensor is an image having a first view angle or a first focal distance, and store the acquired image as a first image (1411).

In step 1413, when the internal count value is 3n+1, the imaging apparatus may determine that the image acquired by the image sensor is an image having a second view angle or a second focal distance, and store the acquired image as a second image (1415).

In step 1417, when the internal count value is 3n+2, the imaging apparatus may determine that the image acquired by the image sensor is an image having a third view angle or a third focal distance, and store the acquired image as a third image (1419).

In step 1421, if the images having the first to third view angles or the first to third focal distances are stored, the imaging apparatus increases the internal count value and proceeds to step 1407.

According to method of FIG. 14, the imaging apparatus can store multi-view angle or multi-focus images for each view angle or each focus. Thus, it is possible to obtain multi-view angle or multi-focus images using one imaging apparatus.

Figure 15:
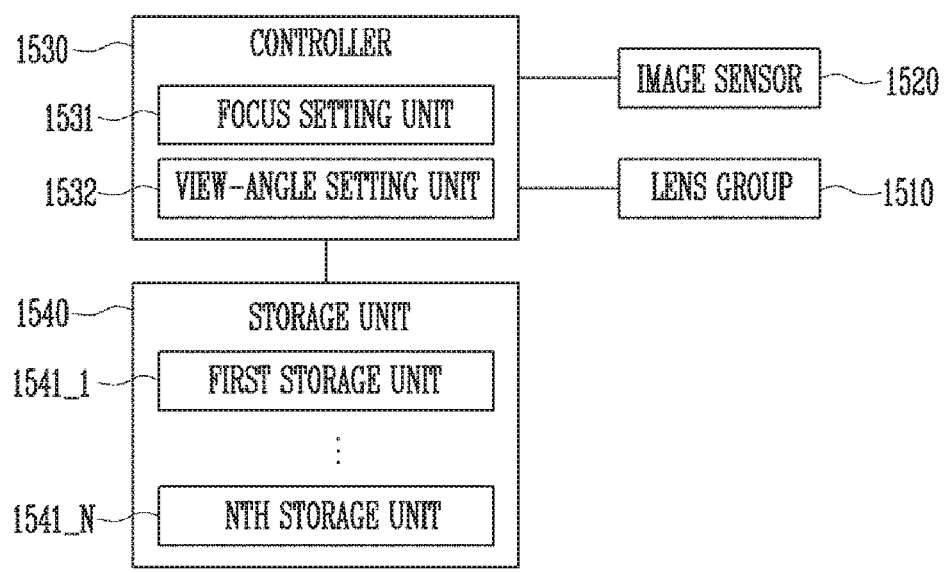
FIG. 15 is a block diagram illustrating a structure of an imaging apparatus according to an embodiment of the present disclosure.

FIG. 15 is a block diagram illustrating a structure of an imaging apparatus according to an embodiment of the present disclosure.

Referring to FIG. 15, the imaging apparatus 1500 may include a lens group 1510, an image sensor 1520, a controller 1530, and a storage unit 1540. In FIG. 15, it is illustrated that the imaging apparatus 150 includes only the lens group 1510, the image sensor 1520, the controller 1530, and the storage unit 1540. However, in various embodiments, the imaging apparatus 1500 may include modules for performing various functions, in addition to the lens group 1510, the image sensor 1520, the controller 1530, and the storage unit 1540. For example, the controller 1530 may further include an internal counter (not shown) for acquiring multi-view angle or multi-focus images for each frame.

The lens group 1510 may include a plurality of lenses. For example, the lens group 1510 may include a view-angle adjusting lens group including at least one lens and a focus adjusting lens. In an embodiment, the focus adjusting lens may include a plurality of lenses. Each of the lenses included in the lens group 1510 may be the optical device of FIG. 4 or 13.

The image sensor 1520 may store information on beams through the plurality of lenses included in the lens group 1510. In an embodiment, the image sensor 1520 may be a CCD image sensor or a CMOS image sensor.

The controller 1530 may control the general operations of the imaging apparatus 1500. The controller 1530 may include a focus setting unit 1531 and a view-angle setting unit 1532.

The focus setting unit 1531 may set an operational range of the focus adjusting lens among the plurality of lenses included in the lens group 1510. The focus adjusting lens may be moved according to the operational range set by the focus setting unit 1531.

The view-angle setting unit 1532 may set operational ranges of the lenses included in the view-angle adjusting lens group among the plurality of lenses included in the lens group 1510. The lenses included in the view-angle adjusting lens group may be moved according to the operational ranges set by the view-angle setting unit 1532.

The controller 1530 may determine a voltage to be applied to electrodes included in connecting parts of the lenses according to the operational range of the lenses according to the operational ranges of the lenses included in the lens group 1510, which are set by the focus setting unit 1531 and the view-angle setting unit 1532, and apply the determined voltage.

The storage unit 1540 may store a plurality of images acquired by the image sensor 1520. The storage unit 1540 may include first to Nth storage units 1541_1 to 1541_N to store multi-view angle or multi-focus images for each frame.

Figure 16:
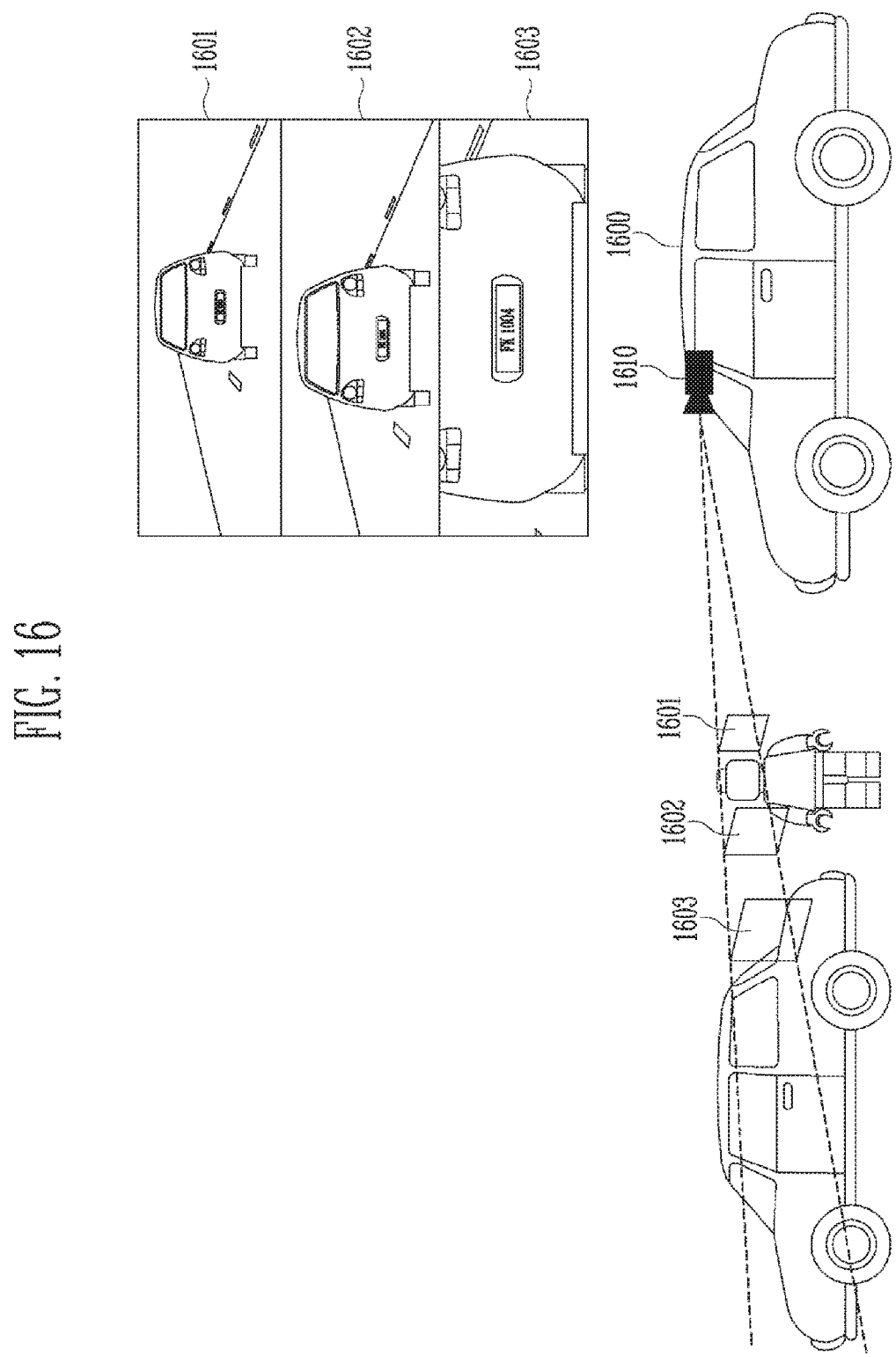
FIG. 16 is a view illustrating an application example of an imaging apparatus according to an embodiment of the present disclosure.

FIG. 16 is a view illustrating an application example of an imaging apparatus according to an embodiment of the present disclosure.

Referring to FIG. 16, the imaging apparatus according to the embodiment of the present disclosure may be a front camera 1610 equipped in a vehicle 1600. In this case, a plurality of images having different view angles or focuses may be acquired by quickly moving, in real time, a lens included in a view-angle adjusting lens group or a focus adjusting lens during movement of the vehicle 1600.

For example, the front camera 1610 may acquire a plurality of images 1601 to 1603 having different view angles.

According to an image sorting method, images photographed in real time for each focal distance are stored in different storage units, respectively. When the front camera stores images having three different focal distances per lens movement period, it is possible to simultaneously obtain an image 1603 having a wide view angle (zoom out) and an image 1601 having a narrow view angle (zoom in). Thus, when accurate information such as a vehicle license number is to be identified, it is possible to confirm a file in which the image 1603 having the narrow view angle is store, thereby achieving accurate character reading. Accordingly, it is possible to obtain the effect of several cameras at the same point of time.

Figure 17:
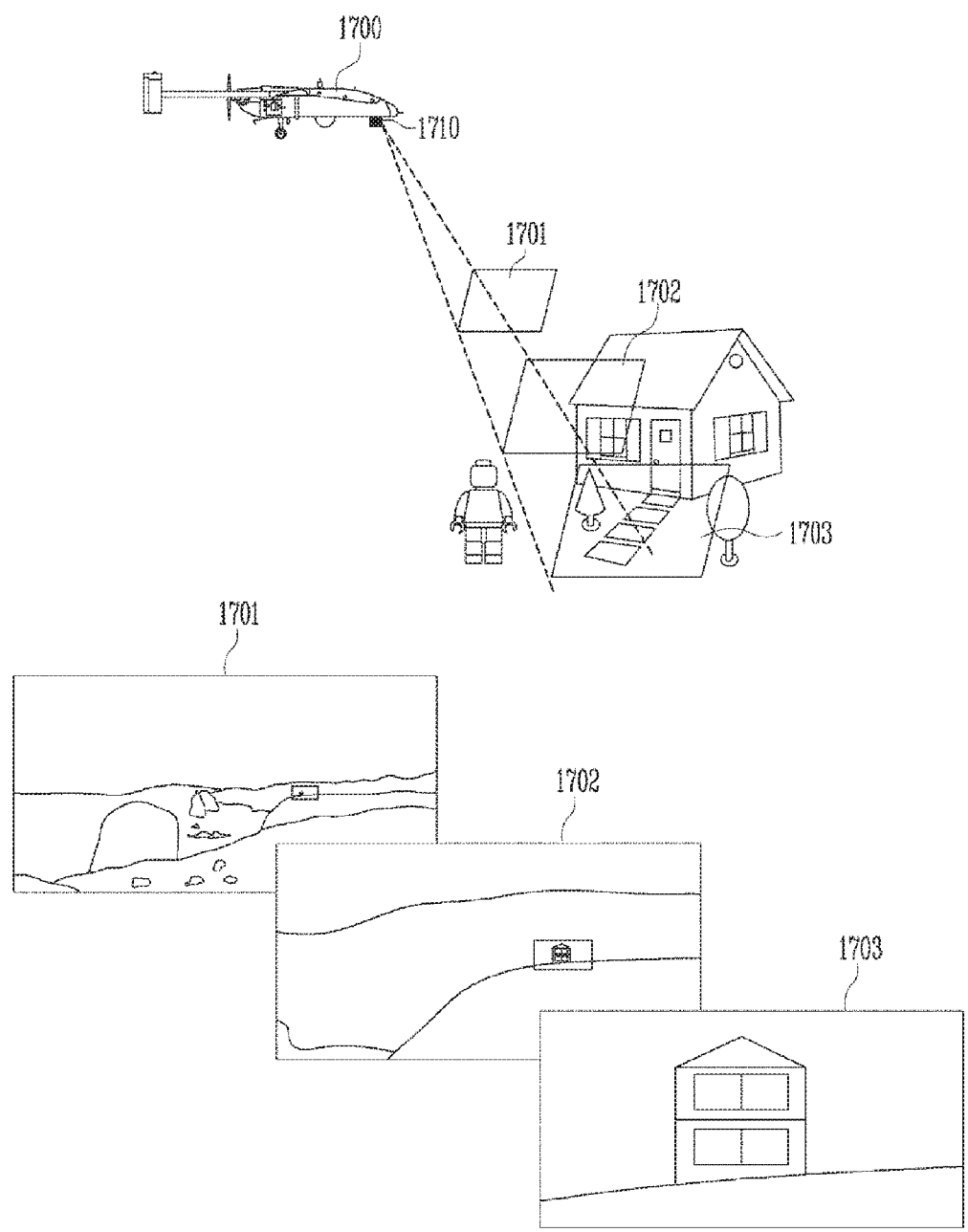
FIG. 17 is a view illustrating another application example of an imaging apparatus according to an embodiment of the present disclosure.

FIG. 17 is a view illustrating another application example of an imaging apparatus according to an embodiment of the present disclosure.

Referring to FIG. 17, the imaging apparatus according to the embodiment of the present disclosure may be applied to a camera 1710 of a drone 1700 for reconnaissance. As photographing is performed by quickly moving view-angle adjusting lenses and a focus adjusting lens, which are included in the one camera 1710 installed in the drone 1700, the photographing of multi-view angle or multi-focus images is possible. Thus, it is possible to save cameras used as many as the number of images photographed per one period. For example, the camera 1710 may acquire a plurality of images 1701 to 1703 having different view angles.

According to embodiment of the present disclosure, it is possible to photograph, at high speed, multi-view angle images having different view angles or multi-focus images having different focuses, based on a high-speed photographing function through high-speed zooming of lenses. Thus, it is possible to obtain the effect that photographing is performed using several imaging apparatuses at the same point of time. Accordingly, it is possible to reduce temporal cost for installation and operation and economical cost corresponding thereto.

According to the present disclosure, it is possible to store multi-view or multi-view angle images using one imaging apparatus for a short period of time.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. An imaging apparatus comprising:
a pair of optical devices; and
an image sensor,
wherein each of the pair of optical devices comprises:
a lens;
a fixing part surrounding an edge of the lens, the fixing part is spaced apart from the lens in a radial direction of the lens; and
a connecting part provided between the lens and the fixing part to connect the lens and the fixing part,
wherein the lens, the connecting part and the fixing part are provided on a plane perpendicular to a center optical axis,
wherein, when a voltage is applied to the connecting part, the lens is moved forward away from the plane and backward away from the plane, respectively, by moving the entire lens axially in a direction parallel to a center optical axis,
wherein, when the lens is moved, a position of the fixing part is fixed, and
wherein, when lenses of the pair of optical devices are moved, a distance between fixing parts of the pair of optical devices is invariant.

2. The imaging apparatus of claim 1, wherein the lens is made of a dielectric material and includes a transparent electrode therein.

3. The imaging apparatus of claim 1, wherein the image sensor is any one of a charge coupled device (CCD) image sensor or a complementary metal-oxide semiconductor (CMOS) image sensor.

4. The imaging apparatus of claim 1, further comprising a controller for controlling the pair of optical devices and the image sensor.

5. The imaging apparatus of claim 4, wherein one of the pair of optical devices comprises a focus adjusting lens,
wherein another of the pair of lens comprises a view-angle adjusting lens,
wherein the controller includes:
a focus setting unit for setting an operational range of the focus adjusting lens; and
a view-angle setting unit for setting an operational range of the view-angle adjusting.

6. The imaging apparatus of claim 5, wherein the controller determines a voltage to be applied to the connecting part according to the operational ranges set by the focus setting unit and the view-angle setting unit, and applies the determined voltage.

7. The imaging apparatus of claim 1, further comprising a storage unit for storing a plurality of images having different view angles or focuses, which are acquired by the image sensor, for each frame that is a number of images to be photographed per one period by the imaging apparatus.

8. The imaging apparatus of claim 1, wherein one of the pair of optical devices has a convex surface and the other of the pair of optical devices has a concave surface facing the convex surface.

9. The imaging apparatus of claim 1, wherein the lens of each of the pair of optical devices has a fixed shape, and
moving the entire lens axially in the direction parallel to the center optical axis includes moving portions of the lens attached to the fixing part.

10. An imaging apparatus comprising:
at least one optical device; and
an image sensor,
wherein the optical device includes:
a lens;
a fixing part surrounding an edge of the lens, the fixing part being spaced apart from the lens in a radial direction of the lens; and
a connecting part between the lens and the fixing part, the connecting part connecting the lens and the fixing part,
wherein the lens is in a first position in a reference state,
wherein, when a voltage is applied to the connecting part, the lens is moved forward to a second position and backward to a third position, respectively, by moving the entire lens axially in a direction parallel to a center optical axis,
wherein the first position is between the second position and the third position, and
wherein, when the lens is moved, a position of the fixing part is fixed.

11. An imaging apparatus comprising:
at least one optical device; and
an image sensor,
wherein the optical device includes:
a lens;
a fixing part surrounding an edge of the lens, the fixing part being spaced apart from the lens in a radial direction of the lens; and
a connecting part between the lens and the fixing part, the connecting part connecting the lens and the fixing part,
wherein the connecting part includes:
a deforming part including an inner side surface contacting the lens, an outer side surface contacting the fixing part, and first and second surfaces between the inner and outer side surfaces, the first and second surfaces oppose each other; and a plurality of electrodes attached to the first and second surfaces of the deforming part.

12. The imaging apparatus of claim 11, wherein the deforming part is stretched or contracted depending on the electrostatic force formed by electric potential between the plurality of electrodes.

13. The imaging apparatus of claim 11, wherein the deforming part has the form of a polymer film made of electroactive polymer.

14. The imaging apparatus of claim 11, wherein the deforming part is made of polydimethylsiloxane.

15. The imaging apparatus of claim 11, wherein the deforming part includes at least one selected from the group consisting of electrorheological fluids, carbon nanotubes, conducting polymers, ionic polymer-metal composites, ionic polymer gels, liquid crystal elastomers, electro-viscoelastic elastomers, electrostrictive polymer, electrostrictive graft elastomers, dielectric elastomers, and ferroelectric polymers.

* * * * *